United States Patent
Lopez De Cardenas et al.

(10) Patent No.: US 11,186,501 B2
(45) Date of Patent: Nov. 30, 2021

(54) CHEMICAL DISPENSING SYSTEM AND METHOD

(71) Applicants: Jorge E. Lopez De Cardenas, Sugar Land, TX (US); Timothy Al Andrzejak, Sugar Land, TX (US); Anthony Frank Veneruso, Sugar Land, TX (US)

(72) Inventors: Jorge E. Lopez De Cardenas, Sugar Land, TX (US); Timothy Al Andrzejak, Sugar Land, TX (US); Anthony Frank Veneruso, Sugar Land, TX (US)

( * ) Notice: Subject to any disclaimer, the term of this patent is extended or adjusted under 35 U.S.C. 154(b) by 0 days.

(21) Appl. No.: 16/739,072

(22) Filed: Jan. 9, 2020

(65) Prior Publication Data

US 2020/0216339 A1   Jul. 9, 2020

Related U.S. Application Data

(60) Provisional application No. 62/790,462, filed on Jan. 9, 2019.

(51) Int. Cl.
  *C02F 1/68* (2006.01)
  *B65D 83/00* (2006.01)
  *B65D 83/06* (2006.01)

(52) U.S. Cl.
  CPC .......... *C02F 1/687* (2013.01); *B65D 83/0005* (2013.01); *B65D 83/06* (2013.01); *C02F 2201/002* (2013.01); *C02F 2201/009* (2013.01); *C02F 2209/005* (2013.01)

(58) Field of Classification Search
  CPC ............... C02F 1/687; C02F 2209/005; C02F 2201/002; C02F 2201/009; C02F 2103/007; C02F 1/686; B65D 83/0005; B65D 83/06
  See application file for complete search history.

(56) References Cited

U.S. PATENT DOCUMENTS

| | | | | |
|---|---|---|---|---|
| 2,045,502 A | * | 6/1936 | Wade | C02F 1/687 222/57 |
| 2,950,959 A | * | 8/1960 | Ve Relle | E03D 9/033 422/263 |
| 3,060,456 A | * | 10/1962 | Jacobs | E03D 9/031 4/226.1 |
| 3,592,358 A | * | 7/1971 | Lugsdin | G05D 11/132 222/52 |

(Continued)

*Primary Examiner* — Edwin J Toledo-Duran

(57) ABSTRACT

A chemical dispensing system for delivering a chemical dose into a water resource is provided herein. The system includes a dispensing housing, a support feature, and an electrical circuit. The dispensing housing includes at least one compartment that is adapted to retain a chemical dose. The compartment is substantially sealable from an ambient environment that is outside of the compartment. The compartment is independently openable and closable to directly expose the compartment to the ambient environment and enable release of contents retained therein in the open position and to substantially prevent release of the contents retained therein in the closed position. The support feature facilitates suspension of the dispensing housing above a surface of the water resource. Opening of the compartment is controllable through the electrical circuit.

20 Claims, 7 Drawing Sheets

(56) References Cited

U.S. PATENT DOCUMENTS

| | | | | | |
|---|---|---|---|---|---|
| 3,653,641 | A | * | 4/1972 | Eron | B01F 3/04773 |
| | | | | | 261/18.1 |
| 3,727,760 | A | * | 4/1973 | Soriano | B01F 1/0027 |
| | | | | | 210/101 |
| 4,217,331 | A | * | 8/1980 | Schaub | B01D 11/00 |
| | | | | | 210/167.11 |
| 4,764,992 | A | * | 8/1988 | Delia | E03D 9/038 |
| | | | | | 4/227.6 |
| 4,798,707 | A | * | 1/1989 | Thomas | C02F 1/688 |
| | | | | | 137/268 |
| 4,999,124 | A | * | 3/1991 | Copeland | A47L 15/4436 |
| | | | | | 222/189.06 |
| 5,053,205 | A | * | 10/1991 | Taylor | B01F 1/0027 |
| | | | | | 422/265 |
| 5,055,183 | A | * | 10/1991 | Buchan | C02F 1/688 |
| | | | | | 210/85 |
| 10,710,912 | B1 | * | 7/2020 | Gomez | C02F 1/688 |
| 2008/0217258 | A1 | * | 9/2008 | Buchan | C02F 1/688 |
| | | | | | 210/747.5 |
| 2011/0072860 | A1 | * | 3/2011 | Johnson | D06F 39/022 |
| | | | | | 68/17 R |
| 2011/0215048 | A1 | * | 9/2011 | Phillips | B01F 5/0604 |
| | | | | | 210/501 |
| 2013/0098820 | A1 | * | 4/2013 | King | A61L 2/23 |
| | | | | | 210/202 |
| 2013/0161180 | A1 | * | 6/2013 | Brown | B01D 1/0035 |
| | | | | | 202/176 |
| 2017/0216783 | A1 | * | 8/2017 | Guy | B01F 1/0027 |
| 2017/0298674 | A1 | * | 10/2017 | Vanini | E05F 15/622 |
| 2019/0040670 | A1 | * | 2/2019 | Dora | E05F 15/63 |
| 2019/0257807 | A1 | * | 8/2019 | Witelson | G01N 33/1826 |
| 2019/0284827 | A1 | * | 9/2019 | Witelson | H02J 50/10 |

* cited by examiner

CHEMICAL DISPENSING SYSTEM AND METHOD

CROSS-REFERENCE TO RELATED APPLICATIONS

This application claims priority to U.S. Provisional Patent App. No. 62/790,462, filed on Jan. 9, 2019.

TECHNICAL FIELD

The technical field generally relates to chemical dispensing systems and methods for managing water resources using the chemical dispensing systems, and more particularly relates to chemical dispensing systems and methods for delivering chemical doses using the chemical dispensing systems.

BACKGROUND

Water storage sites such as ponds, pits, reservoirs, tanks, and the like, often require the addition of chemicals to the water held therein for purposes such as controlling pH, limiting the growth of bacteria and algae, and reducing the rate of evaporation of the water held in such water storage sites. Chemicals that are added to the water can diminish over time owing to decomposition, degradation, reaction, evaporation, and/or metabolization. It may be desirable to recharge chemicals into the water in a given water storage site with additional quantities of a given chemical to sustain the proper levels of the chemicals in the water for effectiveness.

It has been proposed to treat water in water storage sites by adding chemicals to the water using chemical dispensing systems. One example of such a device is configured for deployment on or over a water storage site and operates by spraying a solution of chemicals through a spray head. However, such devices are limited to use with liquid chemicals or solutions of the chemicals having relatively low viscosity. Further, such devices are prone to failure due to clogging of internal conduits or pumps. Devices have also been proposed for delivering dry chemicals, such as chemicals in powder form, through screw conveyor-type designs. However, such devices are prone to clogging and it can be difficult to accurately control precise quantities of chemicals for delivery from the devices. Devices have also been proposed for releasing chemicals that are packaged with impervious material into water. Such devices are adapted with a controller and can be deployed to release the chemicals upon a pre-determined trigger event. Proposed pre-determined trigger events can correlate to either a timing mechanism or use measurements from a detector. FIG. 1 is a prior art figure that depicts the aforementioned unit, which includes the controller 34, sensor 36, and a dispensing housing 38 that contains chemical packages 35 held therein. However, reliable, controlled delivery and protection of the chemicals within the devices from ambient environmental conditions, particularly water intrusion from condensation, humidity, rain or from the water in the water storage site, pose challenges and risks of failure for existing devices.

Accordingly, it is desirable to provide chemical dispensing systems and methods for managing water resources using the chemical dispensing systems that enable reliable, controlled delivery of chemicals contained therein into a body of water that is external to the chemical dispensing systems while minimizing potential clogging. It is also desirable to provide chemical dispensing systems and methods that enable adequate protection of chemicals from ambient conditions, such as water intrusion into the chemical dispensing systems, until such time as delivery of the chemicals into the water from the chemical dispensing system is desired. Furthermore, other desirable features and characteristics will become apparent from the subsequent summary and detailed description and the appended claims, taken in conjunction with the accompanying drawings and the foregoing technical field and background.

BRIEF SUMMARY

A chemical dispensing system for delivering a chemical dose into a water resource is provided herein. The system includes a dispensing housing, a support feature, and an electrical circuit. The dispensing housing includes at least one compartment that is adapted to retain a chemical dose. The compartment is substantially sealable from an ambient environment that is outside of the compartment. The compartment is independently openable and closable to directly expose the compartment to the ambient environment and enable release of contents retained therein in the open position and to substantially prevent release of the contents retained therein in the closed position. The support feature facilitates suspension of the dispensing housing above a surface of the water resource. Opening of the compartment is controllable through the electrical circuit.

BRIEF DESCRIPTION OF THE DRAWINGS

The various embodiments will hereinafter be described in conjunction with the following drawing figures, wherein like numerals denote like elements, and wherein.

DETAILED DESCRIPTION

Figure 1:
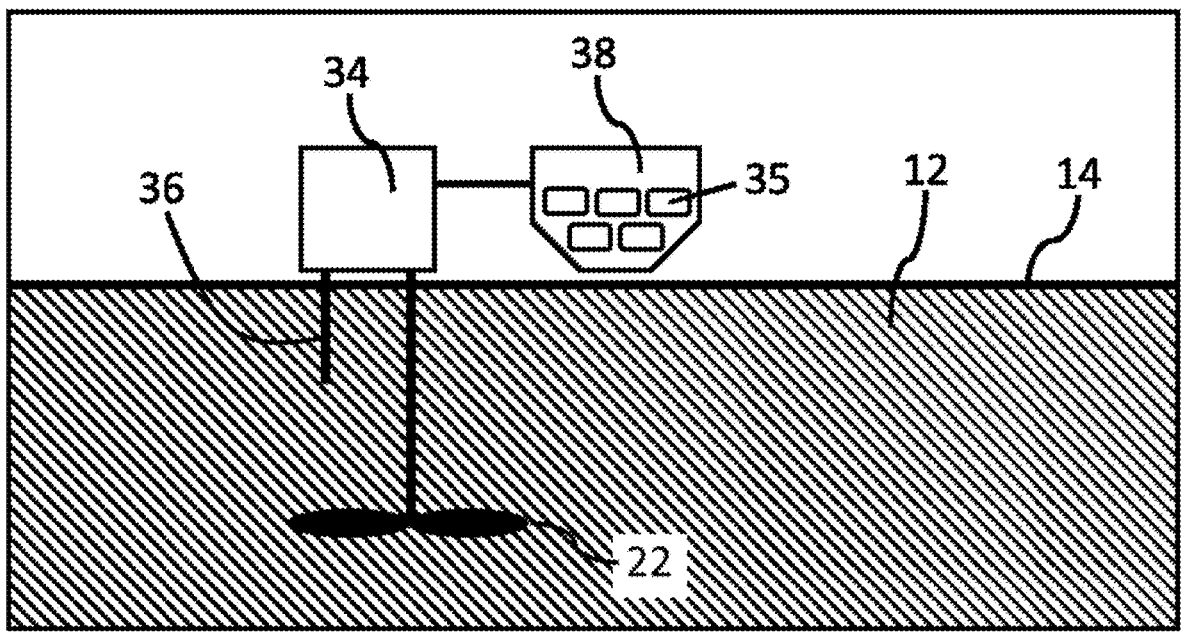
FIG. 1 is a schematic diagram illustrating a prior art controller and a dispersing module for the management of a surface spreading agent.

The following detailed description is merely exemplary in nature and is not intended to limit the chemical dispensing systems and methods as described herein. Furthermore, there is no intention to be bound by any theory presented in the preceding background or the following detailed description.

Chemical dispensing systems for delivering a chemical dose into a water resource and methods for managing water resources are provided herein that enable reliable, controlled delivery of chemicals that are contained in the chemical dispensing system into a water resource, such as a body of water that is external to the chemical dispensing systems, while minimizing potential clogging. The chemical dispensing systems also provide excellent protection of chemicals from ambient conditions, such as water intrusion into the chemical dispensing systems, until such time as delivery of the chemicals into the water from the chemical dispensing system is desired. To provide the aforementioned advantages, the chemical dispensing system includes a dispensing housing that includes at least one compartment adapted to retain a chemical dose with the compartment substantially sealable from an ambient environment outside of the compartment and with the compartment independently openable and closable, separate from other compartments, to directly expose the interior of the compartment to the ambient environment and enable release of contents retained therein in the open position and to substantially prevent release of the contents retained therein in the closed position. More particularly, the at least one compartment is capable of receiving and holding the chemical dose until such time that release of the chemical dose from the chemical dispensing system is desired, and the at least one compartment effectively protects the chemical dose during a period of its residence within the compartment. The chemical delivery systems as described herein are particularly suitable for delivering chemical doses that are in solid or substantially solid form such that substantially all of the chemical is released save for possible residue or trace amounts of particles.

As referred to herein, each "chemical dose" is a charge of chemicals the entirety of which is intended to be delivered as one application (i.e., as part of a scheduled, programmed or instructed release event), and it is to be appreciated that multiple doses can be released at once. The chemical dose can include chemicals packaged as an individual article of known mass within a water-soluble film. By "substantially sealable," as referred to herein, it is meant that the at least one compartment is designed to seal and minimize intrusion of airborne dust or sand particles, bugs, rain or other water from outside of the compartment to the interior of the compartment when the compartment is closed although some water seepage may be permissible provided that the chemical dose can still be effectively released from the compartment. By "directly exposed," it is meant that the system is free from any mechanical device (e.g., a pump, conveyer belt or screw, or conduit) that requires propulsion of the chemical dose therethrough after release from the compartment, although it is to be appreciated that a structure such as a shield, chute, funnel or wide conduit may lead from the compartment toward the water resource provided that any such additional structure does not prevent effective delivery of the chemical dose from the compartment to the water resource.

Figure 2:
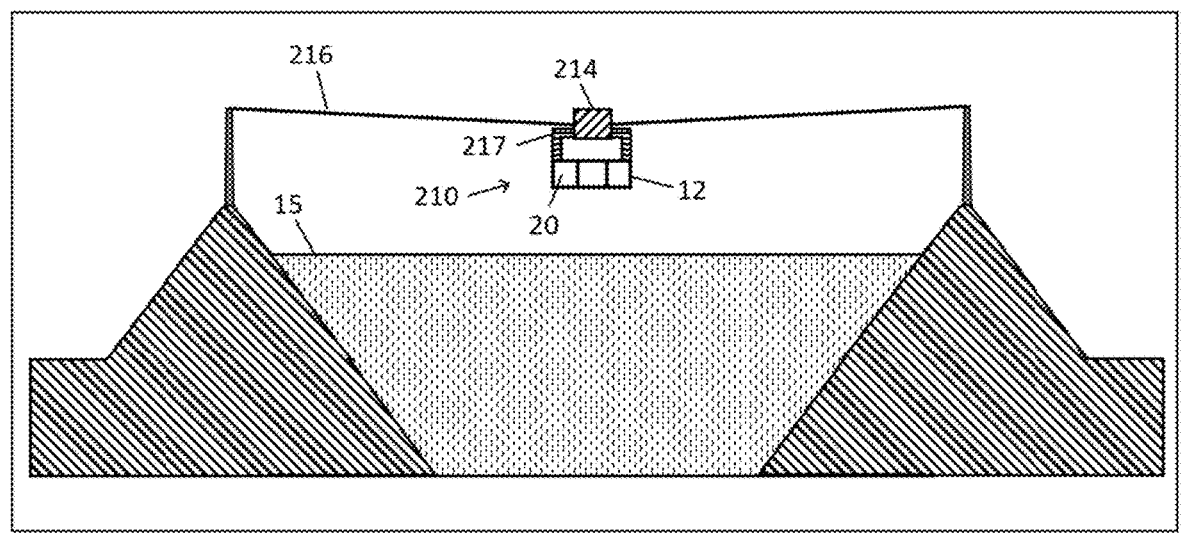
FIG. 2 is an illustration of a chemical dispensing system for delivering a chemical dose into a water resource, with the chemical dispensing system disposed over a water resource, in accordance with an embodiment.
Figure 3:
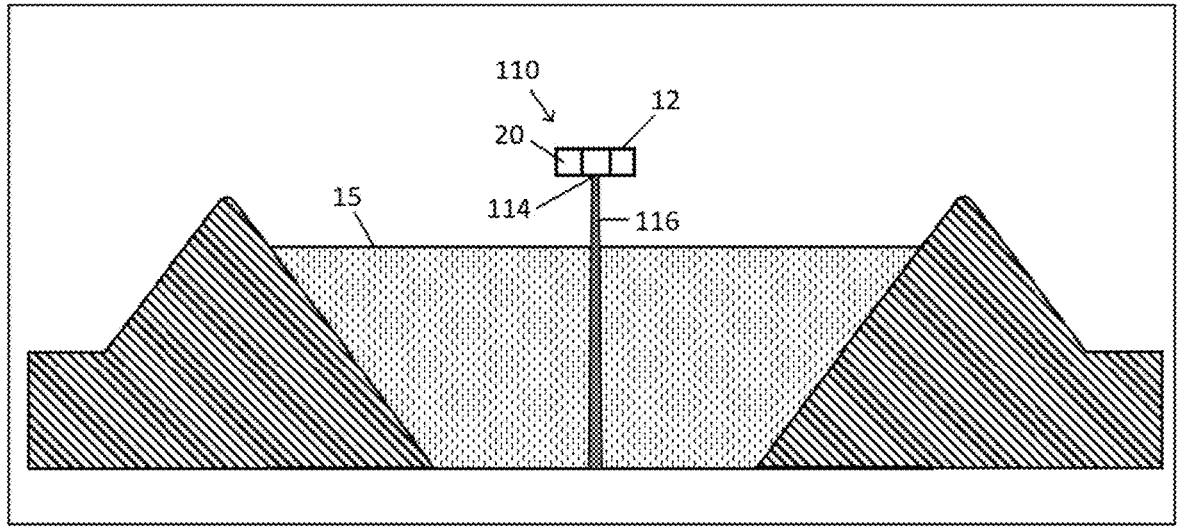
FIG. 3 is an illustration of a chemical dispensing system for delivering a chemical dose into a water resource, with the chemical dispensing system disposed over a water resource, in accordance with another embodiment.
Figure 4:
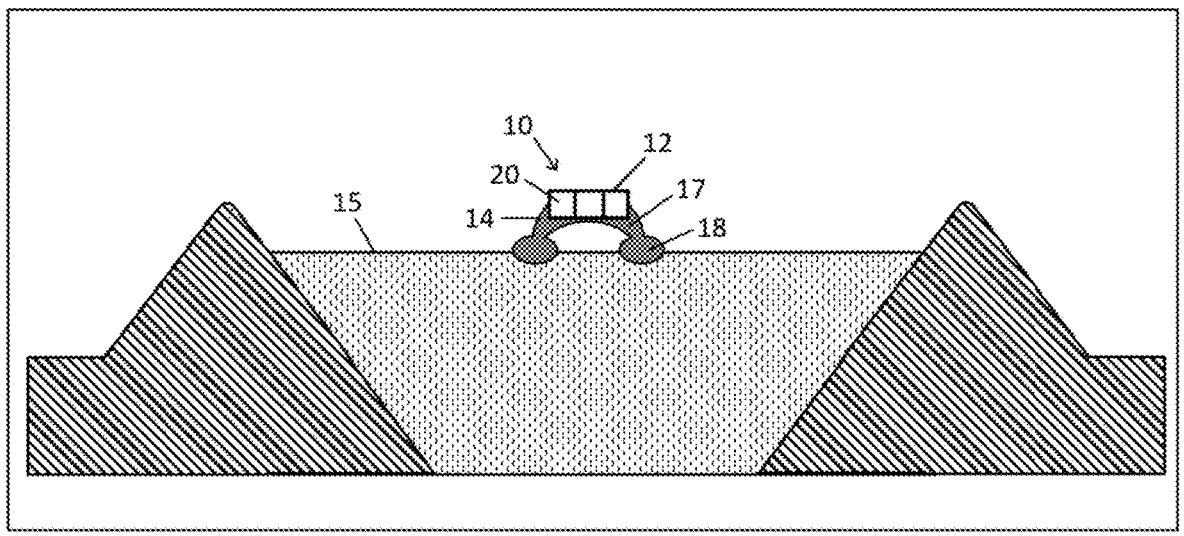
FIG. 4 is an illustration of a chemical dispensing system for delivering a chemical dose into a water resource, with the chemical dispensing system disposed over a water resource, in accordance with another embodiment.

Embodiments of a chemical dispensing system are shown in FIGS. 2-4. As shown in FIGS. 2-4, the chemical dispensing systems 10, 110, 210 each include a chemical dispensing housing 12 and a support feature 14, 114, 214. The support feature 14, 114, 214 facilitates suspension of the dispensing housing 12 above the surface 15 of the water resource by a static structure, e.g., legs (as shown), frame, or a post 116, a scaffold (not shown), a beam (not shown), or a wire 216 (none of which are part of the "support feature" itself as referred to herein). The support feature 14, 114, 214 is part of the chemical dispensing system 10, 110, 210 itself. For example, in an embodiment and as shown in FIG. 2, the support feature 214 is a carriage having at least one arm 217 wherein the dispensing housing 12 is configured to hang from the carriage 214. In another embodiment and as shown in FIG. 3, the support feature 114 includes a mounting surface 114 that is connectable to a static structure, such as the post 116. In another embodiment, as shown in FIG. 4, the support feature 14 includes at least two support arms 17 each having a buoyant member 18 attached thereto to enable flotation of the chemical dispensing system 10, with the support arms 17 configured to maintain the dispensing housing 12 above the surface 15 of the water.

The chemical dispensing system 10, 110, 120 includes at least one compartment 20 that is adapted to retain a chemical dose (not shown). The compartment 20 is substantially sealable by a controllable floor opening or hatch 24 from the ambient environment outside of the compartment 20, which enables effective protection and shielding of any chemical dose contained in the compartment from premature dissolution in water or premature loss of large quantities of the chemical dose from the compartment 20. In this regard, the compartment 20 is configured for substantially dry support and maintenance of the chemical dose therein, and the compartment 20 is free from a liquid inlet into the compartment 20. Further, the chemical dispensing system 10, 110, 120 is generally configured for delivery of the chemical dose into the water resource in dry form such that the device is further free of a liquid pump (not shown) that would be used to pump liquids from the dispensing system 10, 110, 120. Although it is to be appreciated that the chemical dose can be in liquid form, e.g., the chemical dose can potentially be a liquid composition that is encapsulated in a water-soluble pack, the compartment 20 is adapted to deliver the chemical dose in dry form from the compartment into the water resource. For example, a water-soluble pack as the chemical dose may contain liquid or solid material but the exterior of the pack would desirably remain dry at the time of release from the compartment 20.

Various configurations are contemplated for the dispensing housing 12 and the at least one compartment 20 that is adapted to perform the aforementioned functions. For example, in one embodiment and although not shown, the dispensing housing 12 may include a movable turnstile, wherein the movable turnstile includes a plurality of compartments 20, and wherein the movable turnstile is rotatably movable to sequentially move the compartments 20 over an outlet of the dispensing housing 12. In another embodiment, the outlet of the dispensing housing 12 is an opening that allows for gravitational exit of the chemical dose from compartments 20 positioned over the opening. In another embodiment, and as described in detail below, the compartment 20 includes a controllable hinge-mounted floor, door, or hatch 24, that is openable and closable to retain and release the chemical dose.

In embodiments, the compartment 20 is independently openable and closable to directly expose the compartment 20 to the ambient environment and to enable release of contents retained therein in the open position and to substantially prevent release of the contents retained therein in the closed position. The compartment 20 is openable to bulk release the entire contents thereof upon opening. Further, the compartment 20 is independently openable to enable release of contents retained therein while chemical doses in other compartments 20 remain housed in their respective compartments 20 and substantially sealed and protected from the ambient environment.

The embodiment of the chemical dispensing system 10 as shown in FIG. 4 will now be described in further detail with reference to FIGS. 5-9. As alluded to above, the chemical dispensing system 10 includes at least one compartment 20 that is adapted to retain the chemical dose (not shown). In embodiments, the dispensing housing 12 includes a plurality of compartments 20, wherein each compartment is independently openable from other compartments 20. In embodiments and as shown in FIGS. 6 and 7, the plurality of compartments 20 are arranged about a control space 22 where batteries, electrical circuitry and controls may be consolidated as described in further detail below. It is to be appreciated that in other embodiments and although not shown, the chemical dispensing system may include a single compartment that is internally reloadable with a chemical dose in anticipation of delivery to the water resource.

In embodiments, the compartment 20 is openable on at least one side thereof with a structural portion of the compartment 20 openable and optionally closable to enable release of the contents retained in the compartment 20 when the compartment 20 is in the open position. The "structural portion" of the compartment 20, as referred to herein, is a portion of the compartment that defines the space within the compartment 20 and establishes a boundary for the interior of the compartment 20, such as a wall, floor, or ceiling of the compartment. For example, in an embodiment, the compartment 20 includes an openable floor 24 that is movable between an opened and closed position. The openable floor 24 may be supported on a hinge 27, although in other embodiments (not shown) the openable floor 24 may be slidably supported in the dispensing housing 20 to support opening and closing by sliding action as opposed to rotational movement of the openable floor 24.

As alluded to above, the compartment 20 is openable and optionally closable upon command, e.g., by a user or by a preprogrammed autonomous control system, to enable release or retention of a chemical dose that can be placed therein. Various mechanisms for release of the chemical dose using the openable floor 24 (or an openable wall of the compartment) are contemplated. For example, in an embodiment and although not shown, a movable turnstile can be employed in combination with the openable floor. In another embodiment and although not shown, active ejection is possible, where an ejector (not shown) is positioned in the compartment to expel the chemical dose therefrom. With the embodiment of the chemical dispensing system as shown in FIGS. 5-9, the chemical dose may be released from the compartments 20, through the openable floor 24, by force of gravity. For example, in this embodiment, the chemical dispensing system 10 further includes an electromechanical actuator 26 having a movable shaft 28 that mechanically engages the openable floor 24. The movable shaft 28 of the electromagnetic actuator 26 is in mechanical communication with the openable floor 24 to maintain the openable floor 24 in a closed position when the chemical dose is disposed in the compartment 20. In embodiments, the movable shaft 28 is adapted for linear movement, although it is to be appreciated that the movable shaft 28 could alternatively be a rotationally-movable shaft (not shown) to disengage from the openable floor 24 through rotary movement. The movable shaft 28 is movable, upon command, to allow the openable floor 24 to move into an open position with a weight of the chemical dose at a value that exceeds a minimum load of the chemical dose in the compartments 20. In embodiments, the movable shaft 28 is movable to allow the openable floor 24 to move into an open position over a design range of loaded weight values of the chemical dose in the compartment 20 from at least 0.5 kg to up to 10 kg. The aforementioned values are given only as an example of one embodiment. Other embodiments may be conceived, based upon the design principals described above, to achieve a different desired range for the chemical dose's minimum to maximum weight.

Figure 9:
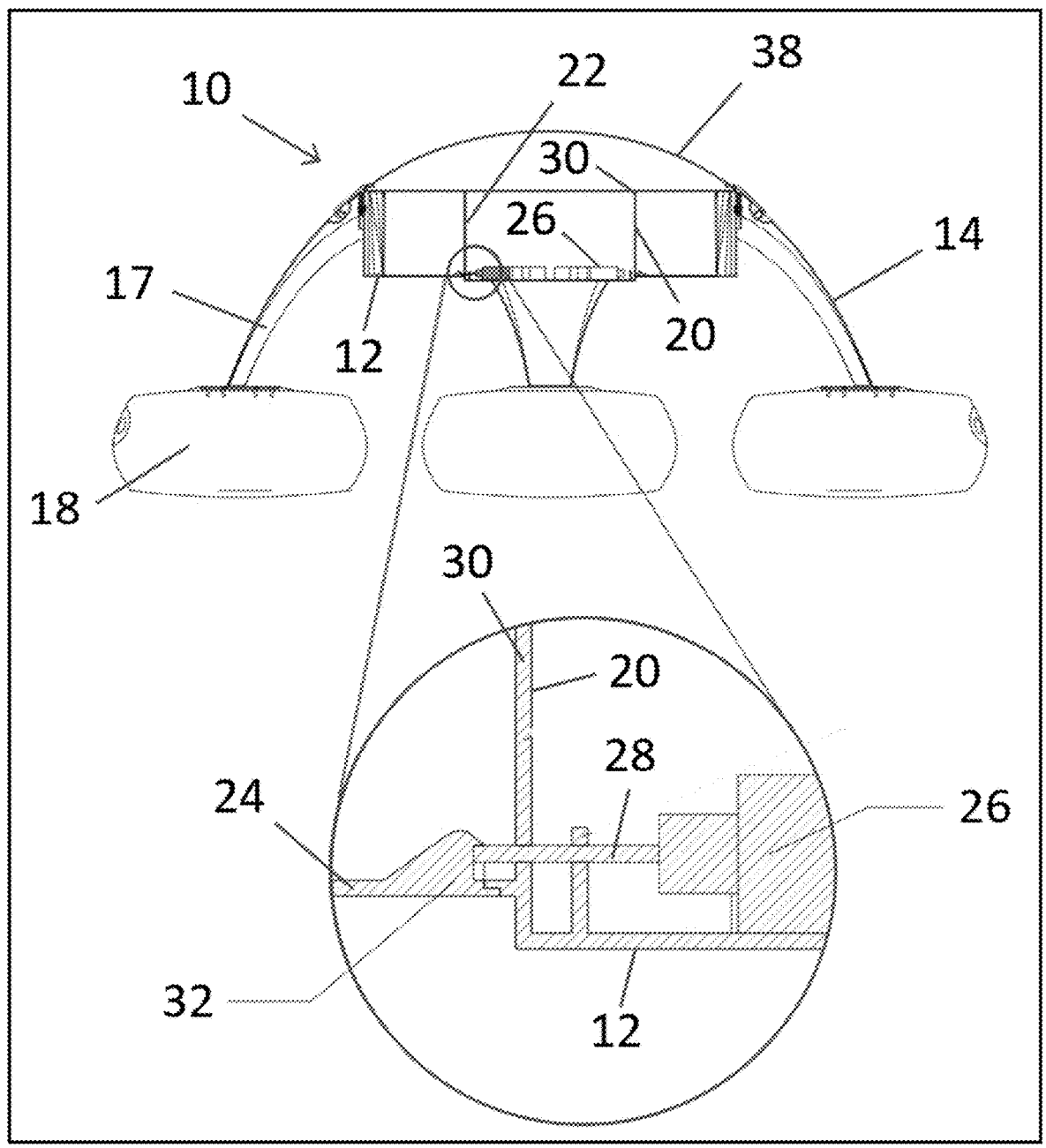
FIG. 9 is a schematic side view of the chemical dispensing system as illustrated in FIG. 4, with an inset showing a partial schematic cross-sectional view of a portion of the chemical dispensing system.

In an embodiment and as shown in FIG. 9, the electromechanical actuator 26 is disposed in the control space 22 and the movable shaft 28 of the electromagnetic actuator 26 engages the openable floor 24 from the control space 22. More particularly, a partition of the compartments 30 separates the control space within the housing 22 from an interior of the compartments 20, and the partition 30 forms a portion of the compartments 20. Referring to the inset of FIG. 9, the movable shaft 28 extends from the control space 22 and through the partition 30 to engage the openable floor 24.

Figure 7:
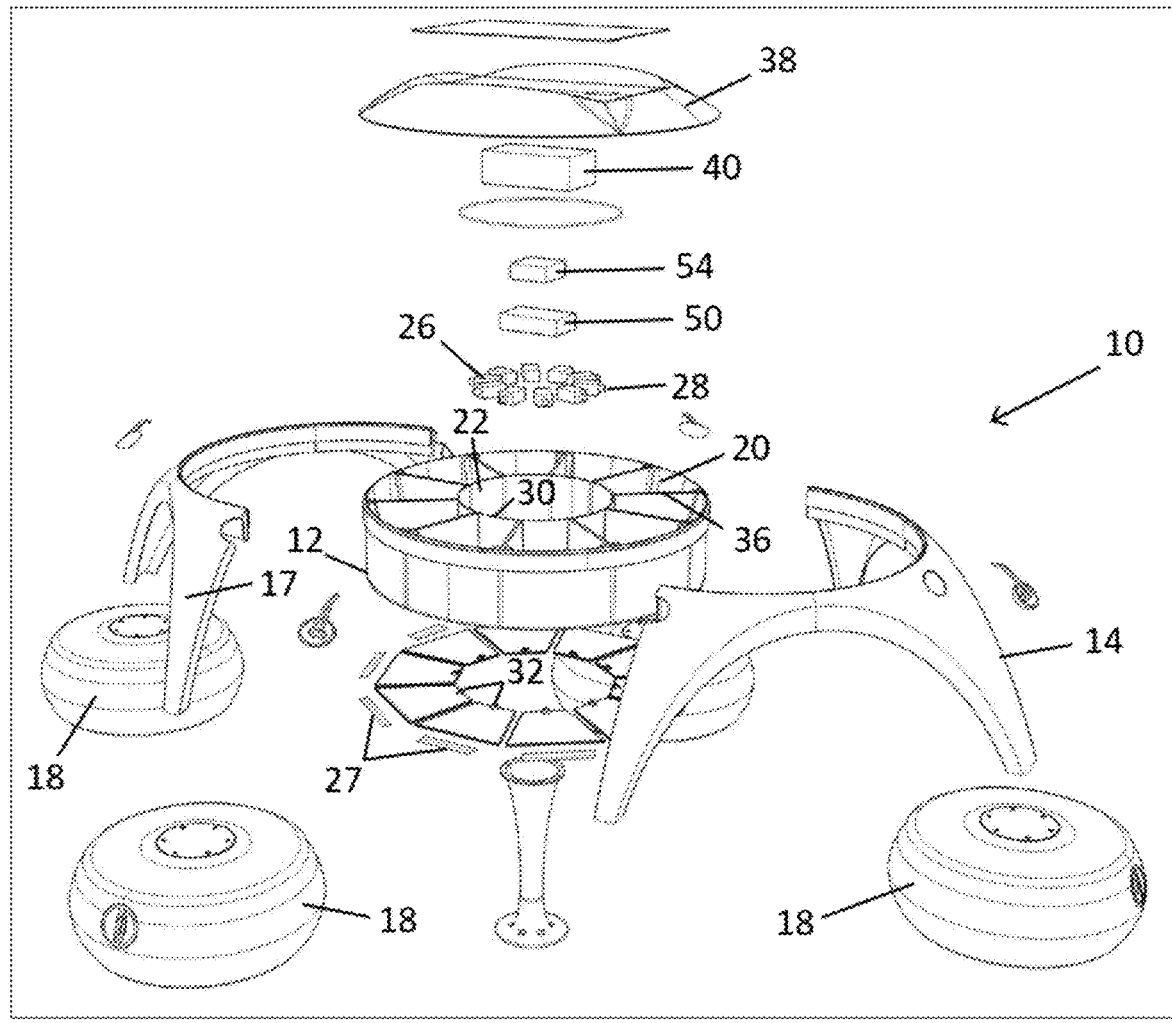
FIG. 7 is an exploded view of the chemical dispensing system of FIG. 4.
Figure 8:
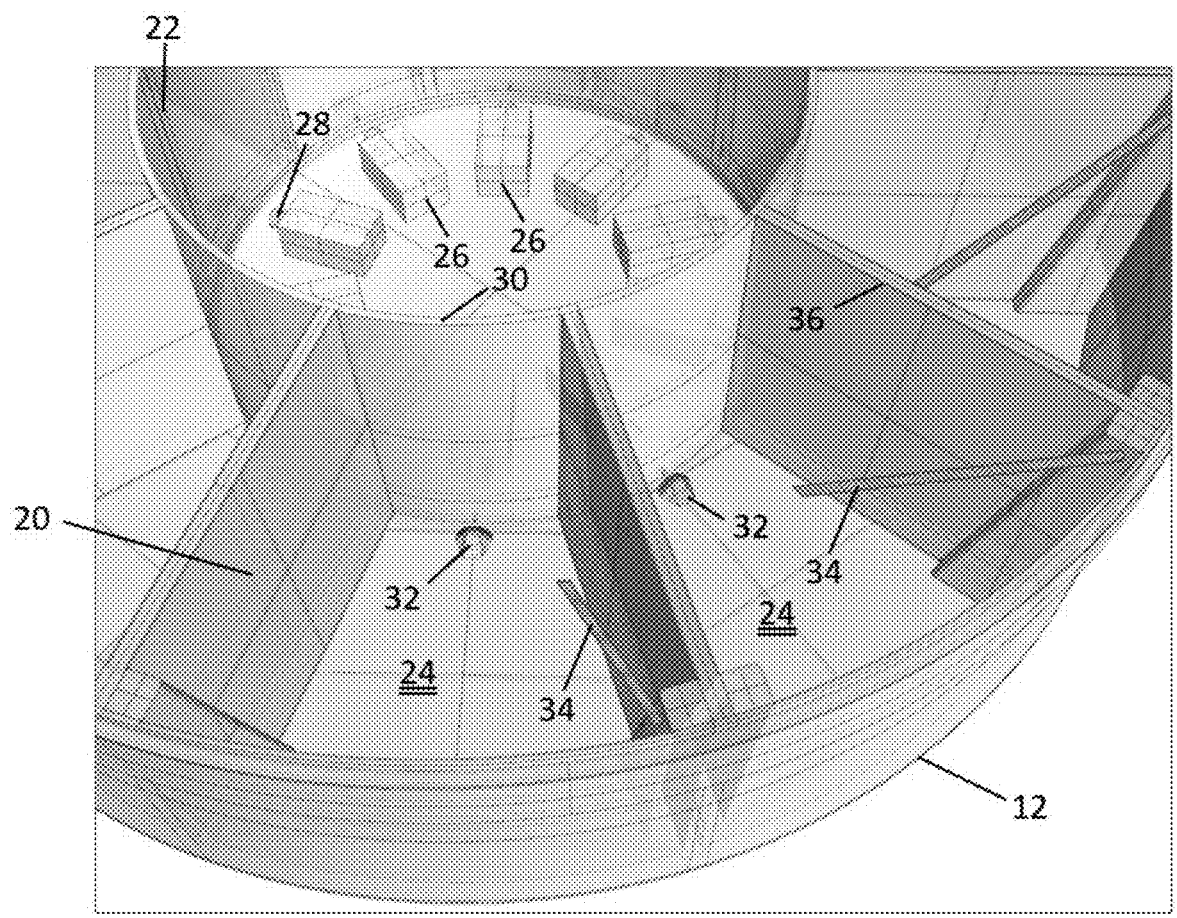
FIG. 8 is a top perspective view of a portion of the chemical dispensing system of FIG. 4.

In embodiments and as shown in FIGS. 7-9, a mechanical latch 32 is associated with openable floor 24, wherein the movable shaft 28 of the electromagnetic actuator 26 engages the mechanical latch 32 when the openable floor 24 is in a closed position. The mechanical latch 32 may be configured to assist with the above-referenced performance parameters relating to movability of the movable shaft 28 to allow the openable floor 24 to move into an open position based on a desired weight range of the chemical dose to be included in the compartment 20. Additionally, the mechanical latch may assist with securing the openable floor in the closed position in cooperation with the partition 30, with the partition 30 reinforcing and supporting the movable shaft 28 when in contact with the mechanical latch 32.

In embodiments, the openable floor 24 is configured for movement into the open position from weight of the chemical dose for release of the chemical dose upon movement of the movable shaft 28. More particularly, the openable floor 24 may be movable into the open position in the absence of any force other than that provide by gravitational pull on the chemical dose. In embodiments, the openable floor 24 is configured for movement into the open position upon movement of the movable shaft 28, where the chemical dose can be released from the compartment 20, with the chemical dose weighing at least 0.5 kg, such as at least 2 kg.

In embodiments, a resilient device 34, such as a spring or leaf, is connected to the openable floor 24 for returning the openable floor 24 to a closed position upon release of the chemical dose. In an embodiment and as best shown in FIG. 8, the resilient device 34 can be a spring attached to the openable floor or to the hinge 27. In embodiments, the openable floor 24 and the mechanical latch 32 are self-latching after return of the openable floor 24 to the closed position by action of the resilient device 34. More particularly, the resilient device 34, openable floor 24, mechanical latch 32, and movable shaft 28 are configured to cooperate after release of the chemical dose to securely reclose the compartment 20 so as to protect the compartment, adjacent compartments, and the interior of the dispensing housing at large, from water, debris or other contaminants or interference (e.g., insects, leaves, blown sand or dirt) from the ambient environment.

Figure 5:
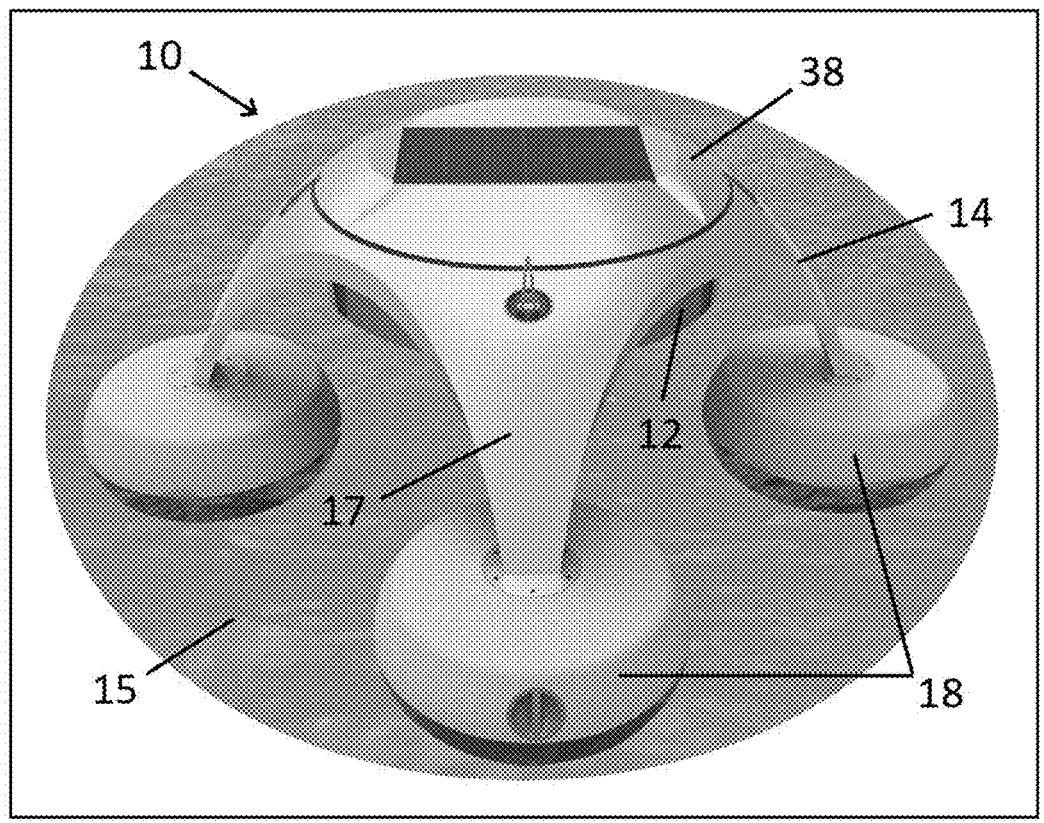
FIG. 5 is a three-dimensional illustration of the chemical dispensing system as shown in FIG. 4.
Figure 6:
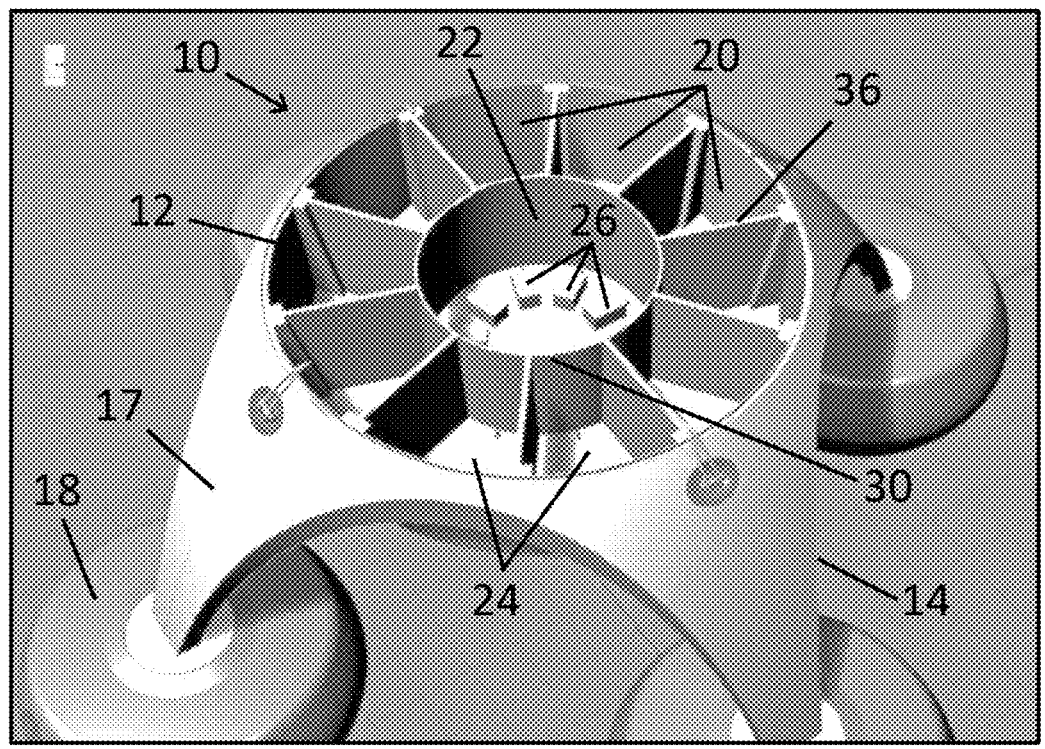
FIG. 6 is a three-dimensional illustration of the chemical dispensing system of FIG. 4 with a lid removed from the chemical dispensing system.

In embodiments and as shown in FIGS. 5-7, the at least one compartment 20 further includes an access port 36 to enable introduction of the chemical dose into the compartment 20. In an embodiment, the compartment 20 is further defined by a removable lid 38 that enables access to the at least one compartment 20, through the access port 36 (which may be an opening into the compartment 20 that is opposite the openable floor 24) for loading the chemical dose therein.

In embodiments, the support feature 14 includes a net or screen (not shown) that surrounds the area of the water where the product is released to the water, with the net/screen providing confinement to the released chemical dose and inhibiting undesirable wind or wave displacement of the released chemical dose.

As best shown in FIG. 7, an electrical circuit 40 is disposed in the control space 22 whereby opening of the compartments 20 is controllable through the electrical circuit 40. The electrical circuit 40 may include a Programmable Logic Controller (PLC) 42, with the PLC 42 also disposed in the control space 22, to provide functions such as automated opening of the compartments 20, e.g., based on time-of-day, time elapsed since previous application of chemical dose, and/or as a function of the measured ambient conditions (e.g., temperature, pressure, relative humidity, wind speed), and/or the water's conditions (e.g., the water's depth, temperature, temperature profile, specific gravity, its chemical pH, and/or its surface tension), or to provide an interface by which instructions can be received from remote communication devices (not shown) to open the compartments 20. However, it is to be appreciated that in other embodiments, a logic circuit by which the electromechanical actuators 26 are controlled may be located off-board of the chemical dispensing system 10. Furthermore, in embodiments, the electrical circuit 40 may be integrated into a package with the electromechanical actuators 24 and need not be separate therefrom.

In embodiments, the electromechanical actuators 26 are electrically connected to the PLC 42. Alternatively, the electromechanical actuators 26 may be in wireless communication with the PLC 42. During operation, one or more of the electromechanical actuators 26 are individually triggered by the PLC 42 upon a pre-determined trigger event to move from a closed position to an open position, thereby allowing the floor 24 to open and release the contents of the corresponding compartment 20. It is to be appreciated that, although not shown, alternative release mechanisms can be applied for deploying the chemical additive from the dispenser housing 12, such as a rotating magazine or an auger system.

Figure 10:
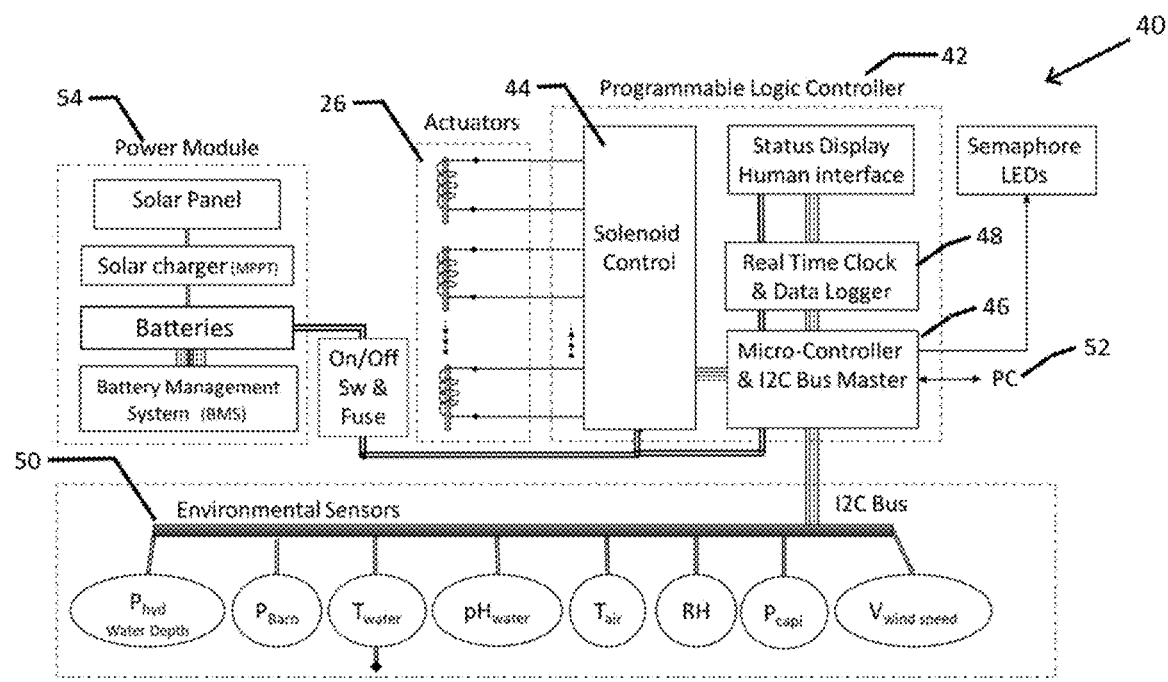
FIG. 10 is a schematic diagram showing electrical components within the chemical dispensing system in accordance with an embodiment.

An embodiment of the electrical components within the chemical dispensing system 10 will now be described with reference to FIG. 10. As referred to herein, the "electrical components" include elements of the system 10 that are programmable to control release of the chemicals from the compartments 20. The electrical components may be programmed to function autonomously to control the electromagnetic actuators 26 for releasing the floor 24 or other releasing mechanism that allows the chemicals to be released from the compartments 20. The electrical components may be further programmed with capability to acquire and store system data and environmental measurements. The electrical components may be further programmed to provide system status information to a user. In an embodiment and as shown in FIG. 10, the electrical components may include, but are not limited to, the PLC 10, which includes a micro-controller 46, an actuator controlling circuit 44, and a clock & data logger 48. The PLC 10 can be pre-programmed to control the electromagnetic actuators 26 of the system 10, for example by using an external computer (not shown) that communicates with the PLC 10 prior to installation of the system 10 at the operational location (i.e., water storage site). The PLC 10 can send commands via solenoid control circuit 44 to the electromechanical actuators 26 which may include a series of solenoids or stepping motors.

The timing of each application of the chemicals to the water from the system 10 can be controlled with the clock 48, and/or using data from environmental sensors 50 to determine an appropriate action to make an application of chemicals based on a function of time and/or measurement data. Therefore, the system 10 can optimize dosing of the chemicals to the water based upon the water's condition and surface state together with environmental conditions. For example, if the wind speed is too high, release of the chemicals can be postponed until the wind speed lowers. It is also possible to control dosing using measurements that relate to the presence or concentration of the chemicals in the water. If the chemicals of interest include a surfactant, for example, the surface tension of the water will be altered due to the presence thereof in the water. It is possible to use a sensor that measures surface tension using capillary tubes and to trigger deployment of more surfactant when the surface tension is detected within a certain range.

To document and provide an historical record of the actual operation of the system 10 and the evolution of the water storage site's state, the PLC 10 depicted in FIG. 10 may include an electronic Real Time Clock (RTC) and data logger, depicted together at 48 although it is to be appreciated that these elements may be physically separate. The RTC 48 may provide the timing measurements for the system 10 in terms of the Coordinated Universal Time (or UTC) standard (i.e., Year, Month, Day, Hour, Minute, and Second). Using the microcontroller 46 and RTC 48 together with its programming, the PLC 10 can also provide autonomous display and recording of the local Daylight Savings Time (DST) "hour". The data logger 48 may record the actions of the system 10, as well as timing and measurements, onto a non-volatile electronic medium, such as a removable Secure Digital card (SD card), removable memory stick, or other well-known non-volatile memory storage media.

To allow autonomous operation of the system depicted in FIG. 10, the power can be provided by a power module 54. In an embodiment, the power module 54 includes a battery which optionally can be rechargeable and/or coupled to a solar panel. The power module 54 may contain a Maximum Power Point Tracking (MPPT), or a Pulse-Width Modulation (PWM) circuit (or similar devices) and a Battery Management System (BMS) to ensure safe and efficient operation of the solar panel and the batteries, not only during the solar charging process but also throughout the life cycle of the system 10. Additionally, or alternatively, a power cable (not shown) can be used from the edge of the water site to supply power to the system 10.

To alert a remote observer as to the state of the dispensing system 10 (i.e., the number of doses made, and/or if the dispensing system 10 is empty, and/or if there has been a system error) a controlled light source shown as a semaphore in FIG. 10 autonomously can provide a unique set of ON-OFF flashes upon command from the micro-controller 46. In one embodiment, the semaphore is implemented using high-intensity Light Emitting Diodes (LEDs).

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment. It being understood that various changes may be made in the function and arrangement of elements described in an exemplary embodiment without departing from the scope as set forth in the appended claims.

What is claimed is:

1. A chemical dispensing system for delivering a chemical dose into a water resource, wherein the system comprises:
a dispensing housing comprising at least one compartment adapted to retain a chemical dose, wherein the compartment is substantially sealable from an ambient environment outside of the compartment, wherein the compartment is independently openable and closable to directly expose the compartment to the ambient environment and enable release of contents retained therein in the open position and to substantially prevent release of the contents retained therein in the closed position, wherein the compartment comprises an openable floor movable between an opened and closed position, and wherein the openable floor is supported on a hinge;
a support feature that facilitates suspension of the dispensing housing above a surface of the water resource; and
an electrical circuit whereby opening of the compartment is controllable through the electrical circuit.

2. The chemical dispensing system of claim 1, wherein the compartment is openable to bulk release the entire contents thereof upon opening.

3. The chemical dispensing system of claim 1, wherein the compartment is configured for substantially dry maintenance of the chemical dose therein, and wherein the compartment is free from a liquid inlet into the compartment.

4. The chemical dispensing system of claim 1, wherein the compartment is openable on at least one side thereof with a structural portion of the compartment openable and closable to enable release of the contents retained in the compartment in the open position.

5. The chemical dispensing system of claim 1, further comprising an electromechanical actuator having a movable shaft that mechanically engages the openable floor.

6. The chemical dispensing system of claim 5, wherein the movable shaft of the electromagnetic actuator is in mechanical communication with the openable floor to maintain the openable floor in a closed position when the chemical dose is disposed in the compartment.

7. The chemical dispensing system of claim 5, wherein a mechanical latch is associated with the openable floor, and wherein the shaft of the electromagnetic actuator engages the mechanical latch when the openable floor is in a closed position.

8. The chemical dispensing system of claim 5, wherein the movable shaft is movable to allow the openable floor to move into an open position with a weight of the chemical dose in the compartment of at least 0.5 kg.

9. The chemical dispensing system of claim 5, wherein the openable floor is configured for movement into an open position from weight of the chemical dose for release of the chemical dose upon movement of the movable shaft.

10. The chemical dispensing system of claim 9, further comprising a resilient device connected to the openable floor for returning the openable floor to a closed position upon release of the chemical dose.

11. The chemical dispensing system of claim 10, wherein a mechanical latch is associated with the openable floor, and wherein the openable floor and the mechanical latch are self-latching after return of the openable floor to the closed position by action of the resilient device.

12. The chemical dispensing system of claim 1, wherein the dispensing housing comprises a plurality of compartments, wherein each compartment is independently openable from other compartments.

13. The chemical dispensing system of claim 12, wherein each of the compartments are independently openable to enable release of contents retained therein while chemical doses in other compartments remain in the respective compartments and substantially sealed from the ambient environment.

14. The chemical dispensing system of claim 12, wherein the plurality of compartments is arranged about a control space, wherein the electrical circuit comprises a programmable logic circuit, and wherein the programmable logic circuit is disposed in the control space.

15. The chemical dispensing system of claim 14, wherein at least one of the compartments comprises an openable floor movable between an opened and closed position, wherein the openable floor is supported on a hinge, and an electromechanical actuator having a movable shaft that mechanically engages the openable floor, and wherein the electromechanical actuator is disposed in the control space.

16. The chemical dispensing system of claim 15, wherein a partition separates the control space from an interior of the compartments, and wherein the partition forms a portion of the compartments.

17. The chemical dispensing system of claim 16, wherein the electromechanical actuator has a movable shaft that mechanically engages the openable floor, and wherein the movable shaft extends from the control space and through the partition to engage the openable floor.

18. The chemical dispensing system of claim 1, wherein the support feature comprises at least two support arms each having a buoyant member attached thereto to enable flotation of the chemical dispensing system with the support arms configured to maintain the dispensing housing above a surface of the water.

19. A chemical dispensing system for delivering a chemical dose into a water resource, wherein the system comprises:
a dispensing housing comprising a plurality of compartments adapted to retain a chemical dose, wherein each compartment is independently openable from other compartments, wherein the compartments are substantially sealable from an ambient environment outside of the compartments, and wherein the compartments are independently openable and closable to directly expose the compartments to the ambient environment and enable release of contents retained therein in the open position and to substantially prevent release of the contents retained therein in the closed position;
a support feature that facilitates suspension of the dispensing housing above a surface of the water resource; and
an electrical circuit comprising a programmable logic circuit whereby opening of the compartments is controllable through the electrical circuit,
wherein the plurality of compartments is arranged about a control space, and wherein the programmable logic circuit is disposed in the control space.

20. A chemical dispensing system for delivering a chemical dose into a water resource, wherein the system comprises:
a dispensing housing comprising at least one compartment adapted to retain a chemical dose, wherein the compartment is substantially sealable from au ambient environment outside of the compartment, and wherein the compartment is independently openable and closable to directly expose the compartment to the ambient environment and enable release of contents retained therein in the open position and to substantially prevent release of the contents retained therein in the closed position;

a support feature that facilitates suspension of the dispensing housing above a surface of the water resource, wherein the support feature comprises at least two support arms each having a buoyant member attached thereto to enable flotation of the chemical dispensing system with the support arms configured to maintain the dispensing housing above a surface of the water, and an electrical circuit whereby opening of the compartment is controllable through the electrical circuit.

* * * * *